US012626979B2

(12) United States Patent
Lee et al.

(10) Patent No.: US 12,626,979 B2
(45) Date of Patent: May 12, 2026

(54) BATTERY CELL

(71) Applicant: SK On Co., Ltd., Seoul (KR)

(72) Inventors: Jong Hyeok Lee, Daejeon (KR); Hyun Ji Kim, Daejeon (KR); Yoon Ji Jo, Daejeon (KR); Chang Mook Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 615 days.

(21) Appl. No.: 17/985,321

(22) Filed: Nov. 11, 2022

(65) Prior Publication Data

US 2023/0170566 A1 Jun. 1, 2023

(30) Foreign Application Priority Data

Nov. 30, 2021 (KR) ........................ 10-2021-0169059

(51) Int. Cl.
H01M 50/186 (2021.01)
H01M 50/105 (2021.01)
H01M 50/178 (2021.01)
H01M 50/184 (2021.01)

(52) U.S. Cl.
CPC ....... H01M 50/186 (2021.01); H01M 50/105 (2021.01); H01M 50/178 (2021.01); H01M 50/184 (2021.01)

(58) Field of Classification Search
CPC ............. H01M 50/186; H01M 50/105; H01M 50/178; H01M 50/184; H01M 50/183; H01M 50/548; H01M 50/557; H01M 50/3425; H01M 50/394; Y02E 60/10
See application file for complete search history.

(56) References Cited

U.S. PATENT DOCUMENTS

2008/0233468 A1* 9/2008 Otohata ................... H01G 9/08
156/275.5
2020/0358044 A1 11/2020 Jang

FOREIGN PATENT DOCUMENTS

| EP | 2549561 A2 | 1/2013 |
| KR | 10-2011-0105737 A | 9/2011 |
| KR | 101508416 B1 * | 4/2015 |
| KR | 10-1546545 B1 | 8/2015 |
| KR | 10-2019-0054735 A | 5/2019 |
| KR | 10-2021-0076770 A | 6/2021 |
| WO | 2021/006529 A1 | 1/2021 |

OTHER PUBLICATIONS

Extended European Search Report for the European Patent Application No. 22208934.4 issued by the European Patent Office on Apr. 19, 2023.

* cited by examiner

*Primary Examiner* — Daniel S Gatewood
(74) *Attorney, Agent, or Firm* — IP & T GROUP LLP

(57) ABSTRACT

A battery cell includes a case having an accommodating space, an electrode assembly including an anode, a cathode, and a separator accommodated in the accommodating space, a first sealing portion formed outside the accommodating space in the case, and sealing the case, and a second sealing portion including a region of the case present outside of the first sealing portion, positioned farther away from the accommodating space than the first sealing portion, and sealing the case. The first sealing portion is formed to be inclined between the accommodating space and the second sealing portion.

7 Claims, 7 Drawing Sheets

100

BATTERY CELL

CROSS-REFERENCE TO RELATED APPLICATION(S)

This application claims benefit of priority to Korean Patent Application No. 10-2021-0169059 filed on Nov. 30, 2021 in the Korean Intellectual Property Office, the disclosure of which is incorporated herein by reference in its entirety.

BACKGROUND

1. Field

The present disclosure relates to a battery cell.

2. Description of Related Art

A battery cell, a battery capable of being charged and discharged, has a vast application range, from relatively small portable electronic devices to mid- to large-sized automobiles and power storage devices.

The battery cell may have a form in which an anode, a cathode, and a separator stack are disposed in a case, and sealing is performed by filling an electrolyte. The battery cell case may have various shapes, such as a pouch, a rectangular shape, a circular shape, and the like.

In the case of such a battery cell, gas caused by the electrolyte may be generated therein in the process of repeating charging and discharging. The gas is accommodated in the case. When pressure thereof is above a certain level, a sealing portion of the case may be unsealed, and the gas may be discharged to the outside of the case.

Accordingly, a timing of unsealing the case, a position in which the case is first unsealed, and a shape of an unsealed portion of the case may be controlled by a method of adjusting the pressure of the gas in the case.

Related Art 1: KR 10-1546545 B1 (Aug. 17, 2015)

SUMMARY

An aspect of the present disclosure is to increase a gas accommodating capacity of a battery cell case and to delay unsealing of the battery cell case by gas.

Another aspect of the present disclosure is to adjust a discharge direction of gas present in a battery cell case.

According to an aspect of the present disclosure, there is provided a battery cell including a case having an accommodating space, an electrode assembly including an anode, a cathode, and a separator accommodated in the accommodating space, a first sealing portion formed outside the accommodating space in the case, and sealing the case, and a second sealing portion including a region of the case present outside of the first sealing portion, positioned farther away from the accommodating space than the first sealing portion, and sealing the case. The first sealing portion may be formed to be inclined between the accommodating space and the second sealing portion.

The electrode assembly may include an anode tab connected to the anode, and drawn out of the case, and a cathode tab connected to the cathode, and drawn out of the case. The first sealing portion and the second sealing portion may be formed in a region from which the anode tab and the cathode tab are drawn out.

The first sealing portion may seal a region in which the case does not oppose the anode tab and the cathode tab. The second sealing portion may seal, with different forces, a region in which the case opposes the anode tab and the cathode tab, and the region in which the case does not oppose the anode tab and the cathode tab.

The first sealing portion may include a first inclined sealing portion formed to be inclined between the second sealing portion and the accommodating space, and a second inclined sealing portion spaced apart from the first inclined sealing portion with the anode tab or the cathode tab interposed therebetween, and formed to be inclined between the second sealing portion and the accommodating space.

The second sealing portion may seal, with stronger force, the region in which the case opposes the anode tab and the cathode tab than the region in which the case does not oppose the anode tab and the cathode tab. The first inclined sealing portion and the second inclined sealing portion may be inclined in different directions.

The second sealing portion may seal, with stronger force, the region in which the case opposes the anode tab and the cathode tab than the region in which the case does not oppose the anode tab and the cathode tab. The first inclined sealing portion and the second inclined sealing portion may be provided in plural. The first inclined sealing portion and the second inclined sealing portion may be inclined in different directions.

The first inclined sealing portion and the second inclined sealing portion may be linearly inclined.

The first inclined sealing portion and the second inclined sealing portion may be non-linearly inclined.

According to the present disclosure, a gas accommodating capacity of a battery cell case may be increased, and a point in time at which the battery cell case is unsealed by gas may be delayed.

In addition, according to the present disclosure, a discharge direction of gas present in a battery cell case may be adjusted.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
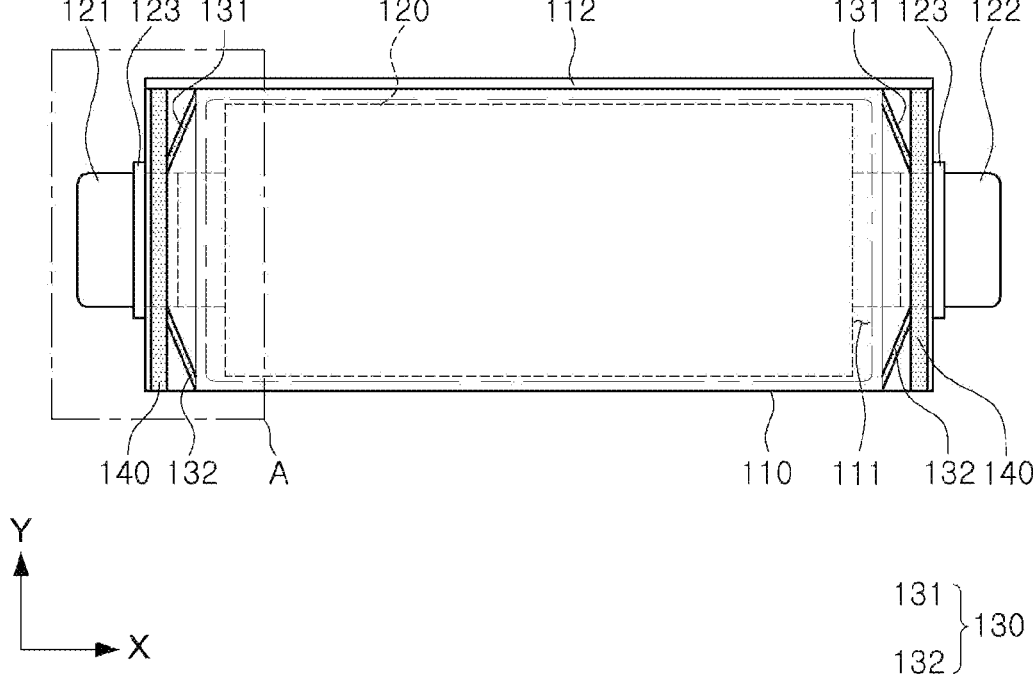
FIG. 1 schematically illustrates a battery cell according to an example embodiment of the present disclosure.

In order to assist in an understanding of descriptions of example embodiments of the present disclosure, elements indicated by the same reference numerals in the accompanying drawings are the same elements, and related elements among elements performing the same operation in each example embodiment are indicated by numbers on the same or extended lines.

In addition, in order to clarify the gist of the present disclosure, descriptions of elements and techniques well known in the related art will be omitted. Hereinafter, the present disclosure will be described in detail with reference to the accompanying drawings.

However, the present disclosure is not limited to the presented example embodiments, and may be proposed in other forms in which specific components are added, changed, or deleted by those skilled in the art, but it should be noted that example embodiments proposed in other forms are also included within the idea and the technical scope of the present disclosure.

In the accompanying drawings, an X-axis is a width direction of a battery cell, a Y-axis is a height direction of the battery cell, and a Z-axis is a thickness direction of the battery cell. However, the above-described axes are directions that are arbitrarily set for ease of description.

FIG. 1 schematically illustrates a battery cell 100 according to an example embodiment of the present disclosure.

The battery cell 100 illustrated in FIG. 1 may include a case 110 in the form of a pouch, and at least one electrode assembly 120 may be accommodated in an accommodating space 111 of the case 110, together with an electrolyte.

The electrode assembly 120 may include an anode (not illustrated), a cathode (not illustrated), and a separator interposed between the anode (not illustrated) and the cathode (not illustrated), and one electrode assembly 120 may be formed with such a configuration. A plurality of electrode assemblies 120 may be present in the accommodating space 111.

An anode tab 121 connected to an anode (not illustrated) of the electrode assembly 120 and a cathode tab 122 connected to a cathode (not illustrated) of the electrode assembly 120 may be drawn out of the case 110, and a lead film 123 may be present between the anode tab 121 and the case 110 and between the cathode tab 122 and the case 110 in a thickness direction of the case 110.

The lead film 123 may facilitate sealing between the case 110 and the anode tab 121 and sealing between the case 110 and the cathode tab 122, and may serve to prevent leakage of the electrolyte present in the accommodating space 111 of the case 110.

An outer surface of the case 110 may be formed of a material including an aluminum alloy, and an inner surface of the case 110 may be formed of a material including polypropylene. The case 110 may be thermally-fused to seal the accommodating space 111.

In the case 110, the anode tab 121 and the cathode tab 122 may be drawn out of the case 110, and may be thermally-fused in a state in which the lead film 123 is respectively added between the case 110 and the anode tab 121 and between the case 110 and the cathode tab 122.

A thermally-fused region of the case 110 may become a first sealing portion 130 and a second sealing portion 140.

When the formation of the first sealing portion 130 and the second sealing portion 140 on the case 110 is completed, at least one end of the case 110 may be folded or rolled to form a folding portion 112. A method of forming the folding portion 112, a position of the folding portion 112, and the number of folding parts 112 are not limited by the present disclosure, and may be appropriately selected and applied according to a specification required for a battery cell.

The first sealing portion 130 and the second sealing portion 140 may be formed by thermal fusion in a state in which opposite surfaces of the case 110 overlap each other.

In the case 110, the first sealing portion 130 and the second sealing portion 140 may be present in plurality, and the first sealing portion 130 and the second sealing portion 140 may be respectively formed in a region of the case 110 from which the anode tab 121 is drawn out and a region of the case 110 from which the cathode tab 122 is drawn out.

In an example embodiment of the present disclosure, the first sealing portion 130 may be present outside of the accommodating space 111 in the case 110. The first sealing portion 130 formed in a region in which the anode tab 121 is present may be present outside of the accommodating space 111 in a −X-direction, and the first sealing portion 130 formed in a region in which the cathode tab 122 is present may be present outside of the accommodating space 111 in a +X-direction. Accordingly, the case 110 may be sealed in a region from which the anode tab 121 and the cathode tab 122 are drawn out.

Figure 2:
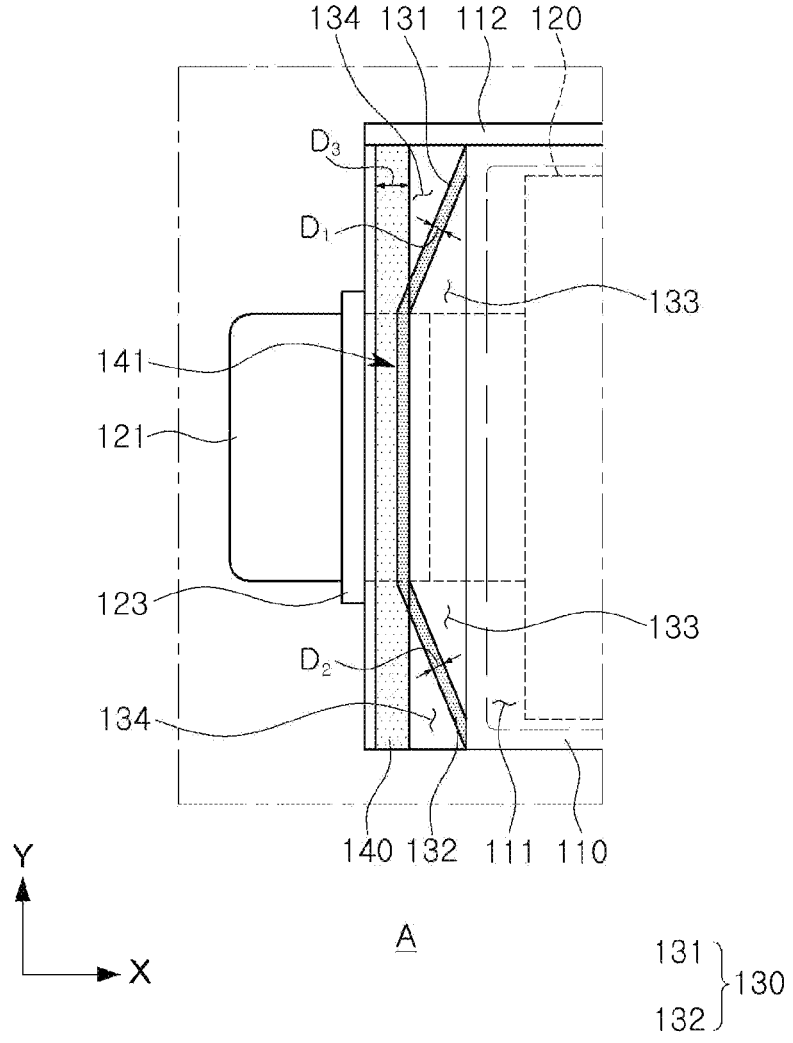
FIG. 2 is an enlarged view of region "A" of FIG. 1.

FIG. 2 is an enlarged view of region "A" of FIG. 1. Hereinafter, a region in which the anode tab 121 is present will be mainly described, and details related to the first sealing portion 130 and the second sealing portion 140 formed in the region in which the anode tab 121 is present may be applied to the first sealing portion 130 and the second sealing portion 140 formed in a region in which a cathode tab (122 in FIG. 1) is present, in the same manner. However, a direction may be changed to a +X-direction.

Gas generated by an electrolyte may be accommodated in a space between the electrode assembly 120 and the first sealing portion 130 in a −X-direction. The gas may remain in the case 110 until pressure thereof reaches a certain level of pressure. However, when the pressure of the gas exceeds force of the first sealing portion 130 for bonding the case 110, the case 110 may be unsealed in the first sealing portion 130.

The second sealing portion 140 may include a region existing outside the first sealing portion 130 and a region connected to the first sealing portion 130 to be in contact with the first sealing portion 130. The second sealing portion 140 may be positioned farther away from the accommodating space 111 than the first sealing portion 130 in the −X-direction. Accordingly, a point in time at which the entire second sealing portion 140 is unsealed may be later than a point in time at which the entire first sealing portion 130 is unsealed.

When the entire first sealing portion 130 is unsealed by the pressure of the gas in the first sealing portion 130, and the pressure of the gas exceeds force of the second sealing portion 140 for bonding the case 110, the case 110 may be unsealed even in the second sealing portion 140.

When the entire second sealing portion 140 is unsealed in an X-axis direction or is unsealed in a Y-axis direction, the gas may be discharged to the outside of the case 110. As described above, when the point in time at which the first sealing portion 130 is unsealed and the point in time at which the entire second sealing portion 140 is unsealed are set to be different from each other, the case 110 may be unsealed in stages, and a point in time at which the case 110 is entirely open may be delayed.

In an example embodiment of the present disclosure, the first sealing portion 130 may be present in a region in which the case 110 does not oppose the anode tab 121 and the cathode tab (122 in FIG. 1) in a thickness direction of case 110, and the second sealing portion 140 may be present in a region in which the case 110 opposes the anode tab 121 and the cathode tab (122 in FIG. 1) in the thickness direction of the case 110 and the region in which the case 110 does not oppose the anode tab 121 and the cathode tab (122 in FIG. 1) in the thickness direction of the case 110.

In an example embodiment of the present disclosure, when the second sealing portion 140 is formed, sealing force in the region in which the case 110 opposes the anode tab 121 and the cathode tab (122 in FIG. 1) may be set to be stronger than sealing force in the region in which the case 110 does not oppose the anode tab 121 and the cathode tab (122 in FIG. 1). Such a setting may be implemented by allowing the case 110 to be more strongly bonded in the region in which the case 110 opposes the anode tab 121 and the cathode tab (122 in FIG. 1) than the region in which the case 110 does not oppose the anode tab 121 and the cathode tab (122 in FIG. 1).

Accordingly, the second sealing portion 140 may have non-uniform sealing force in a direction, parallel to a Y-axis, and may have relatively strong sealing force in the region in which the case 110 opposes the anode tab 121 and the cathode tab (122 in FIG. 1). Accordingly, gas may be concentrated in a region of the second sealing portion 140 in which the case 110 does not oppose the anode tab 121 and the cathode tab (122 in FIG. 1) in the thickness direction of the case 110.

Accordingly, in an example embodiment of the present disclosure, the case 110 may form a first inclined sealing portion 131 and a second inclined sealing portion 131 so as to prevent gas from being concentrated in the region in which the case 110 does not oppose the anode tab 121 and the cathode tab (122 in FIG. 1). The first inclined sealing portion 131 and the second inclined sealing portion 132 may serve to guide the gas to the region in which the case 110 opposes the anode tab 121 and the cathode tab (122 in FIG. 1) in the thickness direction of the case 110, that is, a region of the second sealing portion 140 having relatively strong sealing force.

When the gas is concentrated in the region in which the case 110 does not oppose the anode tab 121 and the cathode tab (122 in FIG. 1), the region of the second sealing portion 140 in which the case 110 does not oppose the anode tab 121 and the cathode tab (122 in FIG. 1) may be entirely unsealed in the −X-direction. Thus, even when sealing of the case 110 is still maintained in a region of the second sealing portion 140 in which the case 110 opposes the anode tab 121 and the cathode tab (122 in FIG. 1), venting of the gas may already be performed in the region in which the case 110 does not oppose the anode tab 121 and the cathode tab (122 in FIG. 1).

Accordingly, in an example embodiment of the present disclosure, the first inclined sealing portion 131 and the second inclined sealing portion 132 may be introduced to disperse pressure of gas in the direction, parallel to the Y-axis, and to allow the gas not to be concentrated in the region in which the case 110 does not oppose the anode tab 121 and the cathode tab (122 in FIG. 1). Accordingly, a discharge direction of the gas in the accommodating space 111 may be adjusted, and the sealing force of the second sealing portion 140 may be used evenly in the Y-axis direction.

In addition, it is possible to prevent venting firstly occurring in a portion in which the sealing force of the second sealing portion 140 is relatively weak, and to delay a point in time of gas venting by delaying a point in time at which the case 110 is unsealed.

In an example embodiment of the present disclosure, the first inclined sealing portion 131 and the second inclined sealing portion 132 may be present between the accommodating space 111 and the second sealing portion 140 in a direction, parallel to an X-axis. The first inclined sealing portion 131 may be present in side region of the anode tab 121 in a +Y-direction, and the second inclined sealing portion 132 may be present on the side region of the anode tab 121 in a −Y-direction.

The first inclined sealing portion 131 and the second inclined sealing portion 132 may be spaced apart from each other with the anode tab 121 interposed therebetween. The first inclined sealing portion 131 and the second inclined sealing portion may be formed to be inclined between the second sealing portion 140 and the accommodating space 111. The first inclined sealing portion 131 and the second inclined sealing portion 132 may be inclined to form a predetermined angle with respect to the X-axis.

In an example embodiment of the present disclosure, the first inclined sealing portion 131 and the second inclined sealing portion 132 may be linearly inclined, and the first inclined sealing portion 131 and the second inclined sealing portion 132 may be inclined in different directions.

A distance in a direction, parallel to the Y-axis, between the first inclined sealing portion 131 and the second inclined sealing portion 132 may increase in the +X-direction. The first inclined sealing portion 131 and the second inclined sealing portion 132 may be radially formed from the second sealing portion 140 in the X-axis direction.

When the first inclined sealing portion 131 is inclined to form a predetermined angle with the X-axis, a space for gas to remain in the case 110 may be additionally secured, thereby delaying a point in time of gas venting.

With respect to the first inclined sealing portion 131, a first unbonded region 133 may be present toward the accommodating space 111, and the second unbonded region 134 may be present toward the second sealing portion 140. The first unbonded region 133 and the second unbonded region 134, regions to which the case 110 is not bonded, may be regions that are easily openable by gas.

The first unbonded region 133 may be a space in which the gas may remain until pressure of the gas exceeds sealing force of the first inclined sealing portion 131. Gas generated in the accommodating space 111 may be moved to a region in which the second sealing portion 140 opposes the anode tab 121 in the thickness direction of the case 110 or to the first unbonded region 133.

Then, the second sealing portion 140 may be partially unsealed in the region in which the second sealing portion 140 opposes the anode tab 121, and a partial region of the second sealing portion 140 may become an unsealed region 141. The unsealed region 141 may include an entire region indicated with a darker shade, as compared to a shade of the second sealing portion 140.

Subsequently, when the pressure of the gas continues to increase, the gas may move to the first unbonded region 133, and a predetermined amount of gas may be accommodated in the first unbonded region 133. When the gas continues to flow out of the accommodating space 111 and exceeds an amount of gas that is accommodatable by the first unbonded region 133, the first inclined sealing portion 131 and the second inclined sealing portion 132 may also become the unsealed region 141.

However, a point in time at which a partial region of the second sealing portion 140 becomes the unsealed region 141 and a point in time at which partial regions of the first inclined sealing portion 131 and the second inclined sealing portion 132 become the unsealed region 141 may be the same. However, a point in time at which entire regions of the first inclined sealing portion and the second inclined sealing portion become the unsealed region 141 may be earlier than a point in time at which an entire region of the second sealing portion 140 becomes the unsealed region 141.

In an example embodiment of the present disclosure, a thickness $D_1$ of the first inclined sealing portion 131 and a thickness $D_2$ of the second inclined sealing portion 132 may be greater than 0 mm and less than or equal to 2 mm. The thickness $D_1$ of the first inclined sealing portion 131 and the thickness $D_2$ of the second inclined sealing portion 132 may have the same value or different values. The thicknesses are not necessarily limited by the present disclosure, and may be appropriately selected and applied according to a specification required for battery cells.

The thickness $D_1$ of the first inclined sealing portion 131 and the thickness $D_2$ of the second inclined sealing portion 132 may be less than a thickness $D_3$ of the second sealing portion 140. A width in the direction, parallel to the X-axis, between the accommodating space 111 and the second sealing portion 140 may be relatively narrower than an overall width of the case 110. Accordingly, when the thickness $D_1$ of the first inclined sealing portion 131 and the thickness $D_2$ of the second inclined sealing portion 132 are more than 0 mm and less than 2 mm, the first inclined sealing portion 131 and the second inclined sealing portion 132 may be easily formed in a region between the accommodating space 111 and the second sealing portion 140.

When the pressure of the gas continues to increase, the pressure of the gas may be dispersed along the first inclined sealing portion 131 and the second inclined sealing portion 132 in the direction, parallel to the X-axis, and the direction, parallel to the Y-axis, such that a point in time at which the case 110 is de-bonded from the second sealing portion 140 in the direction, parallel to the X-axis, or the direction, parallel to the Y-axis, may be delayed.

In addition, the gas may flow along the first inclined sealing portion 131 and the second inclined sealing portion 132, and thus the gas may be guided to be away from the electrode assembly 120 in the −X-direction, which may serve to protect the electrode assembly 120 as well as contribute to adjusting a vent position of the gas.

In addition, the first inclined sealing portion 131 and the second inclined sealing portion 132 may be disposed to precede the second sealing portion 140 in the −X-direction, a discharge direction of the gas. In an example embodiment of the present disclosure, the first inclined sealing portion 131 and the second inclined sealing portion 132 may be disposed at a front end of a region in which the case 110, a portion of the second sealing portion 140 having relatively weak sealing force, does not oppose the anode tap 121 in the thickness direction of the case 110.

In an example embodiment of the present disclosure, the first inclined sealing portion 131 and the second inclined sealing portion 132 may be disposed to precede the portion of the second sealing portion 140 having relatively weak sealing force in the −X-direction, the discharge direction of the gas. Accordingly, the first inclined sealing portion 131 and the second inclined sealing portion 132 may reinforce the sealing force of the portion of the second sealing portion 140 having relatively weak sealing force, and may prevent the portion of the second sealing portion 140 having relatively weak sealing force from being opened earlier than a portion of the second sealing portion 140 having relatively strong sealing force.

Figure 3:
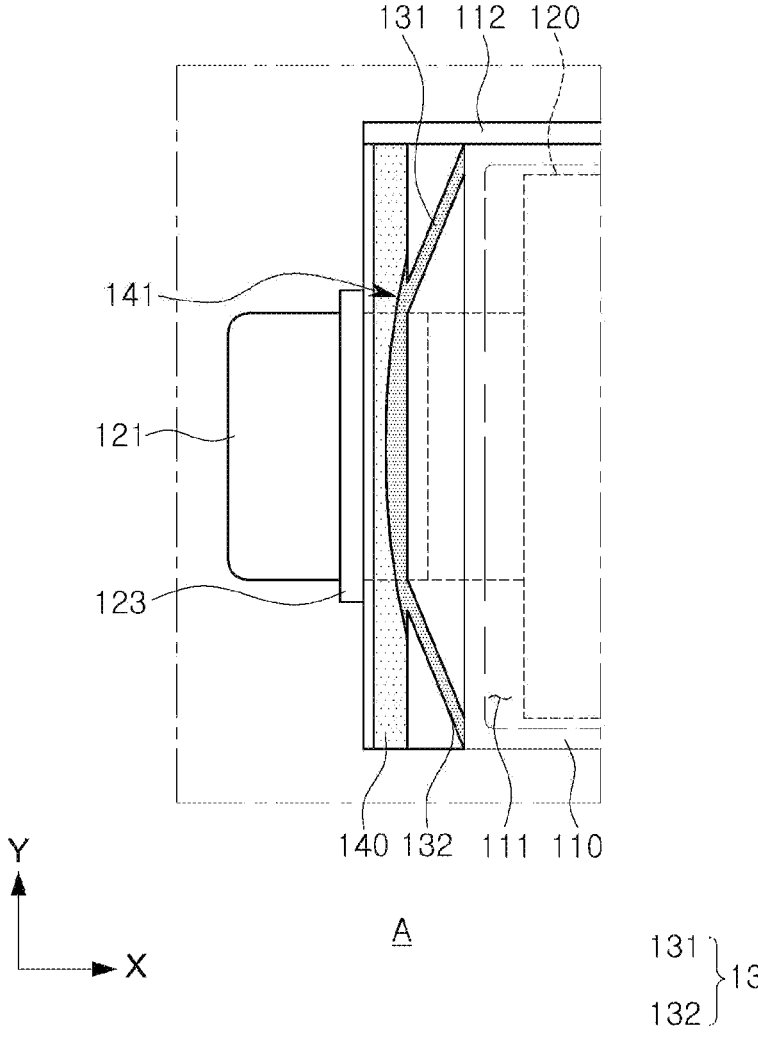
FIG. 3 illustrates a state in which gas pressure is further increased in FIG. 2.

FIG. 3 illustrates a state in which gas pressure is further increased in FIG. 2. As illustrated in FIG. 3, when the case 110 is unsealed in the first inclined sealing portion 131 and the second inclined sealing portion 132, both the first inclined sealing portion 131 and the second inclined sealing portion 132 may be the unsealing region 141.

In such a state, when the pressure of the gas further increases, part of the gas may be guided to the second sealing portion 140 by the first inclined sealing portion 131 and the second inclined sealing portion 132 to move in a −X-direction in the second sealing portion 140. Accordingly, it is possible to prevent the gas from being concentrated in a region in which the second sealing portion 140 has relatively weak sealing force, which may delay a point in time at which the second sealing portion 140 is entirely unsealed in a direction, parallel to an X-axis, and may contribute to delaying a point in time of gas venting.

Figure 4:
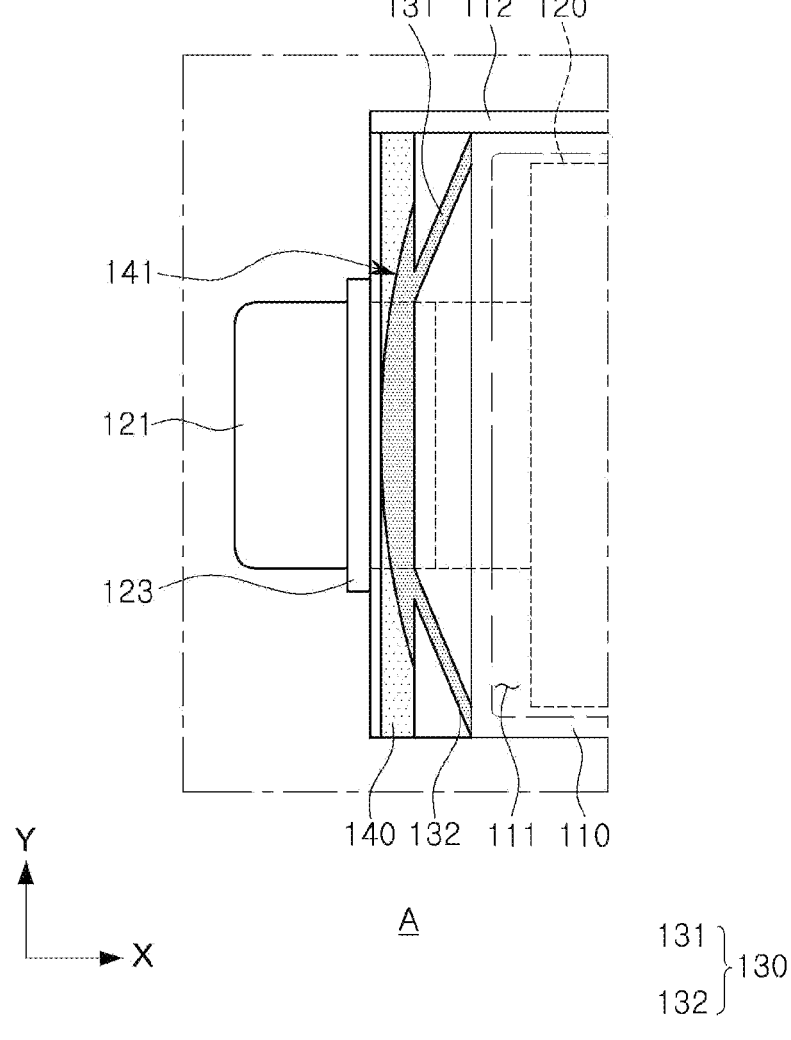
FIG. 4 illustrates a state in which gas pressure is further increased in FIG. 3.

FIG. 4 illustrates a state in which gas pressure is further increased in FIG. 3. In the second sealing portion 140, most of a region in which the case 110 opposes the anode tab 121 may be the unsealing region 141.

When the second sealing portion 140 has strongest sealing force in a region in which the anode tab 121 is present in a thermal fusion operation of the second sealing portion 140, the case 110 may be generally unsealed in a region in which the case 110 does not oppose the anode tab 121, that is, a portion having relatively weak sealing force.

Accordingly, in an example embodiment of the present disclosure, gas may be guided to the region in which the case 110 opposes the anode tab 121 by the first inclined sealing portion 131 and the second inclined sealing portion 132. Accordingly, in the present disclosure, most of the region in which the case 110 opposes the anode tab 121 may be allowed to become the unsealing region 141 before unsealing is performed in the region in which the case 110 does not oppose the anode tab 121.

Such a case may be a case in which the second sealing portion 140 has strongest sealing force in a region in which the anode tab 121 is present in a direction, parallel to a Y-axis, and the first inclined sealing portion 131 and the second inclined sealing portion 131 may serve to guide gas to a region in which the second sealing portion 140 has strongest sealing force.

Accordingly, in an example embodiment of the present disclosure, gas may be guided to the region in which the case 110 opposes the anode tab 121 through the first inclined sealing portion 131 and the second inclined sealing portion 132 to delay a point in time at which an entire region of the sealing portion 140 is unsealed. Accordingly, the entire region of the second sealing portion 140 may be unsealed to allow the case 110 to be opened.

In such a manner, inclination directions of the first inclined sealing portion 131 and the second inclined sealing portion 132 may be adjusted to adjust a direction in which the gas is guided, and a vent direction or position of the gas may be adjusted, which may be applied to a region in which a cathode tab (122 in FIG. 1) is present, in the same manner.

Figure 5:
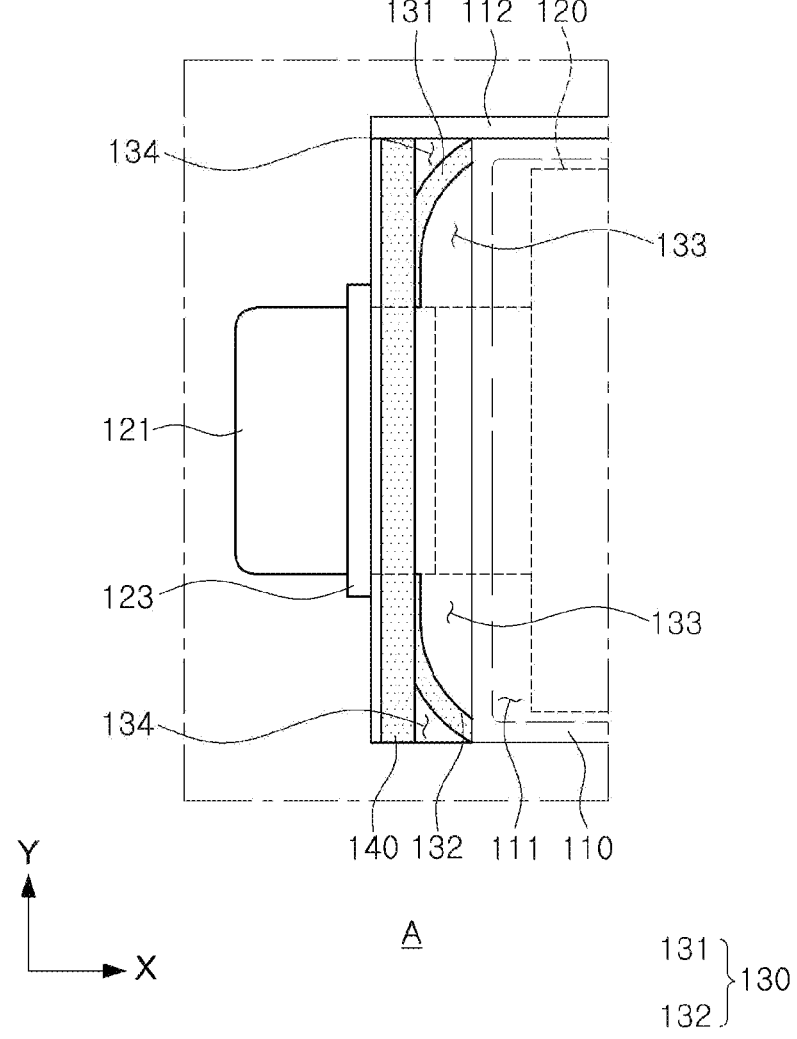
FIG. 5 is an enlarged view of a first inclined sealing portion and a second inclined sealing portion according to another example embodiment of the present disclosure.

FIG. 5 is an enlarged view of the first inclined sealing portion 131 and the second inclined sealing portion 132 according to another example embodiment of the present disclosure.

As illustrated in FIG. 5, the first inclined sealing portion 131 and the second inclined sealing portion 132 according to another example embodiment of the present disclosure may be non-linearly inclined, and the first inclined sealing portion 131 and the second inclined sealing portion 132 may include a curve. Accordingly, a volume of a first de-bonded region 133 may be larger than a volume of the second de-bonded region 134.

In addition, accordingly, a width of the first de-bonded region 133 in a direction, parallel to an X-axis, may be widest in a region adjacent to the anode tab 121, and may become narrower as a distance from the anode tab 121 increases. Accordingly, more gas may be accommodated in the region adjacent to the anode tab 121, which may be applied to the second inclined sealing portion 132 in the same manner.

Accordingly, a larger amount of gas may be easily guided into the region adjacent to the anode tab 121. Accordingly, it is possible to prevent the gas from being concentrated in a region of the second sealing portion 140 in which the case 110 does not oppose the anode tab 121, that is, a portion having relatively weak sealing force. In addition, the gas may be evenly dispersed in a Y-axis direction of the second sealing portion 140, which may be applied to the region in which a cathode tab (122 in FIG. 1) is present, in the same manner.

Figure 6:
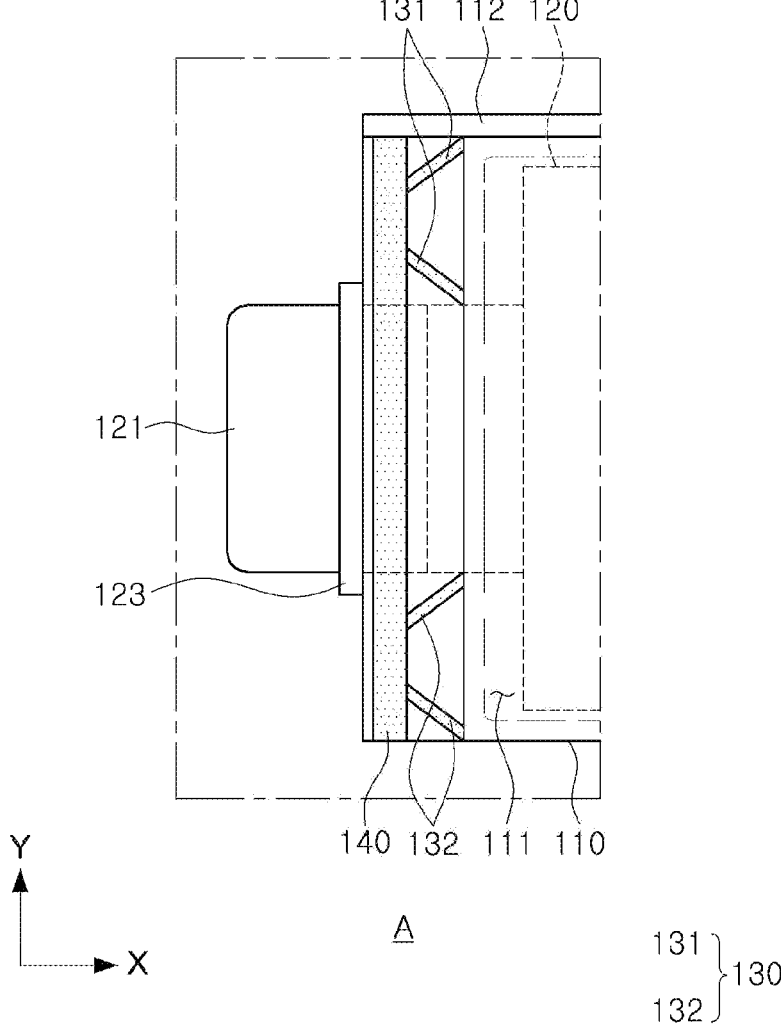
FIG. 6 is an enlarged view of a first inclined sealing portion and a second inclined sealing portion according to another example embodiment of the present disclosure.

FIG. 6 is an enlarged view of the first inclined sealing portion 131 and the second inclined sealing portion 132 according to another example embodiment of the present disclosure. FIG. 6 illustrates a case in which the second sealing portion 140 has relatively stronger sealing force in a region in which the case 110 does not oppose the anode tap 121 in a thickness direction of the case 110, rather than a region in which the case 110 opposes the anode tap 121 in the thickness direction of the case 110.

As illustrated in FIG. 6, each of the first inclined sealing portion 131 and the second inclined sealing portion 132 may be provided in plural. A plurality of first inclined sealing portions 131 may be radially formed from the second sealing portion 140, and may be formed to be away from each other in a +X-direction. In addition, a plurality of second inclined sealing portions 132 may also be radially formed from the second sealing portion 140, and may be formed to be away from each other in the +X-direction, which may be to a region in which a cathode tab (122 in FIG. 1) is present, in the same manner.

Accordingly, it is possible to prevent the gas from being concentrated in the region in which the case 110 opposes the anode tab 121 in the thickness direction of the case 110, and the gas may be dispersed in the region in which the case 110 does not oppose the anode tab 121 in the thickness direction of the case 110.

Accordingly, it is possible to prevent the case 110 from being preferentially unsealed in the region in which the case 110 opposes the anode tab 121. When the case 110 is unsealed, an entire region of the second sealing portion 140 of the case 110 may be allowed to be in an unsealed state.

Figure 7:
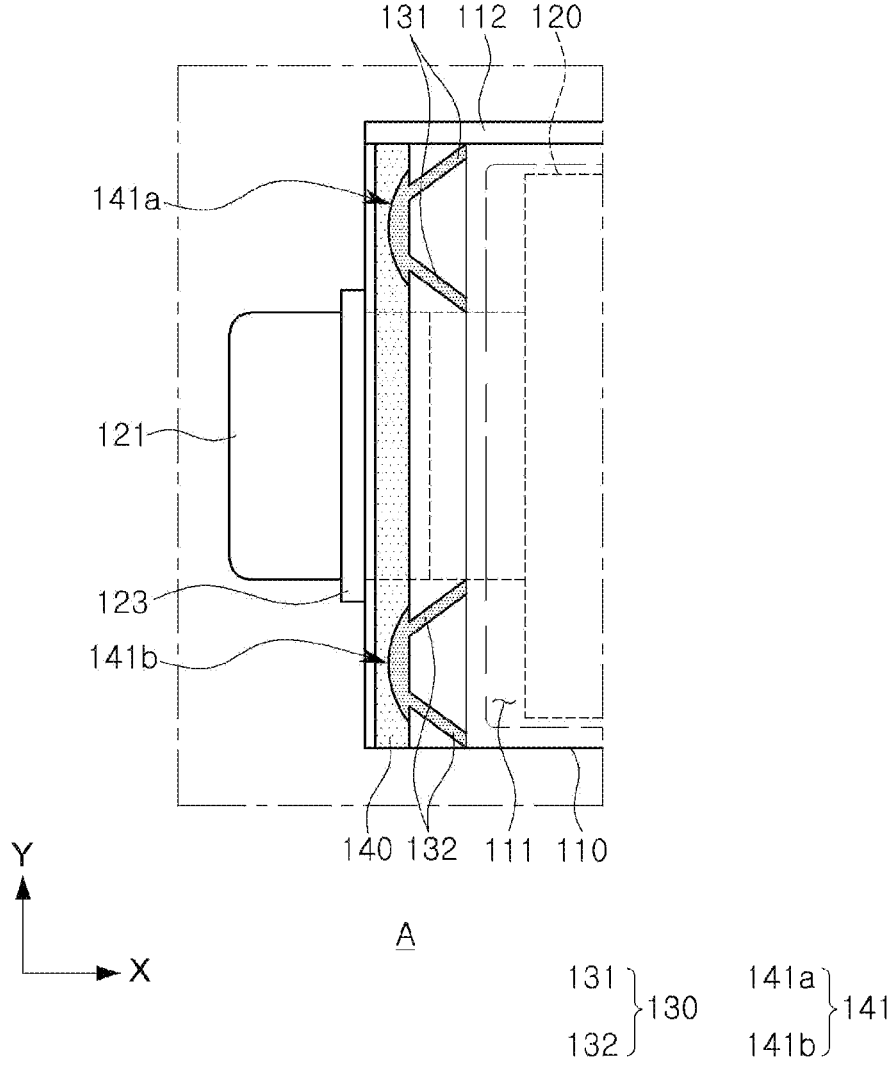
FIG. 7 schematically illustrates a state in which a case is de-bonded from the first inclined sealing portion and the second inclined sealing portion illustrated in FIG. 6.

FIG. 7 schematically illustrates a state in which the case 110 is de-bonded from the first inclined sealing portion 131 and the second inclined sealing portion 132 illustrated in FIG. 6.

As illustrated in FIG. 7, the unsealed region 141 of the case 110 may be present as a first unsealed region 141a in a region in which the first inclined sealing portion 131 is present, and may be present as a second unsealed region 141b in a region in which the second inclined sealing portion 132 is present.

Gas may flow along the plurality of first inclined sealing portions 131 and the plurality of second inclined sealing portions 132, such that the gas may be concentrated to a point in which the second sealing portion 140 and the plurality of first inclined sealing portions 131 meet, and may be concentrated at a point in which the second sealing unit 140 and the plurality of second inclined sealing units 132 meet.

Accordingly, the gas may be guided to a region in which the case 110 does not oppose the anode tab 121, which may be applied to a region in which a cathode tab (122 in FIG. 1) is present, in the same manner.

According to the present disclosure as described above, a discharge direction of the gas present in the case 110 may be adjusted, and a gas accommodating capacity of the case 110 may be increased, thereby delaying a point in time of gas venting.

While example embodiments have been shown and described above, it will be apparent to those skilled in the art that modifications and variations could be made without departing from the scope of the present disclosure as defined by the appended claims.

What is claimed is:

1. A battery cell comprising:
a case having an accommodating space;
an electrode assembly including an anode, a cathode, and a separator accommodated in the accommodating space;
a first sealing portion formed outside the accommodating space in the case, and sealing the case; and
a second sealing portion including a region of the case present outside of the first sealing portion, positioned farther away from the accommodating space than the first sealing portion, and sealing the case,
wherein the first sealing portion is formed to be inclined between the accommodating space and the second sealing portion,
wherein the electrode assembly includes:
an anode tab connected to the anode, and drawn out of the case; and
a cathode tab connected to the cathode, and drawn out of the case, and
the first sealing portion and the second sealing portion are formed in a region from which the anode tab and the cathode tab are drawn out,
wherein the first sealing portion seals a region in which the case does not oppose the anode tab and the cathode tab, and
the battery cell further comprising an unbonded region disposed toward the accommodating space on an inner side of the first sealing portion and not overlapping with an edge of the case.

2. The battery cell of claim 1, wherein
the second sealing portion seals, with different sealing forces, a region in which the case opposes the anode tab and the cathode tab, and the region in which the case does not oppose the anode tab and the cathode tab, and
wherein the case is bonded such that the region opposing the anode tab and the cathode tab and the region not opposing the anode tab and the cathode tab are bonded with different sealing forces.

3. The battery cell of claim 2, wherein the first sealing portion includes:
a first inclined sealing portion formed to be inclined between the second sealing portion and the accommodating space; and
a second inclined sealing portion spaced apart from the first inclined sealing portion with the anode tab or the cathode tab interposed therebetween, and formed to be inclined between the second sealing portion and the accommodating space.

4. The battery cell of claim 3, wherein
the second sealing portion seals, with stronger sealing force, the region in which the case opposes the anode tab and the cathode tab than the region in which the case does not oppose the anode tab and the cathode tab, and wherein the case is bonded such that a region opposing the anode tab and the cathode tab is bonded with stronger sealing force than a region not opposing the anode tab and the cathode tab, wherein the first inclined sealing portion and the second inclined sealing portion are inclined in different directions.

5. The battery cell of claim 3, wherein the second sealing portion seals, with stronger sealing force, the region in which the case does not oppose the anode tab and the cathode tab than the region in which the case oppose the anode tab and the cathode tab, and wherein the case is bonded such that a region not opposing the anode tab and the cathode tab is bonded with stronger sealing force than a region opposing the anode tab and the cathode tab, wherein the first inclined sealing portion and the second inclined sealing portion are provided in plural, wherein the first inclined sealing portion and the second inclined sealing portion are inclined in different directions.

6. The battery cell of claim 3, wherein the first inclined sealing portion and the second inclined sealing portion are linearly inclined.

7. The battery cell of claim 3, wherein the first inclined sealing portion and the second inclined sealing portion are non-linearly inclined.

* * * * *